Dec. 9, 1930.  W. H. SWARTZ  1,784,319
SANITARY MILK PAIL
Filed Sept. 27, 1929

W. H. Swartz
Inventor
By C. A. Snow & Co.
Attorneys.

Patented Dec. 9, 1930

1,784,319

UNITED STATES PATENT OFFICE

WILLIAM H. SWARTZ, OF CELINA, OHIO

SANITARY MILK PAIL

Application filed September 27, 1929. Serial No. 395,630.

This invention relates to milk pails, and aims to provide a novel form of milk pail whereby the milk will be strained as the milk passes into the milk pail during the milking operation.

Another object of the invention is to provide a strainer so constructed that a compartment is provided into which foreign matter collects prior to the passage of the milk to the strainer, thereby preventing the foreign matter from collecting on the strainer to clog the strainer.

A still further object of the invention is the provision of a funnel shaped removable upper section and a removable straining member supported thereby, so that the strainer may be readily removed and cleaned insuring a sanitary milk pail.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
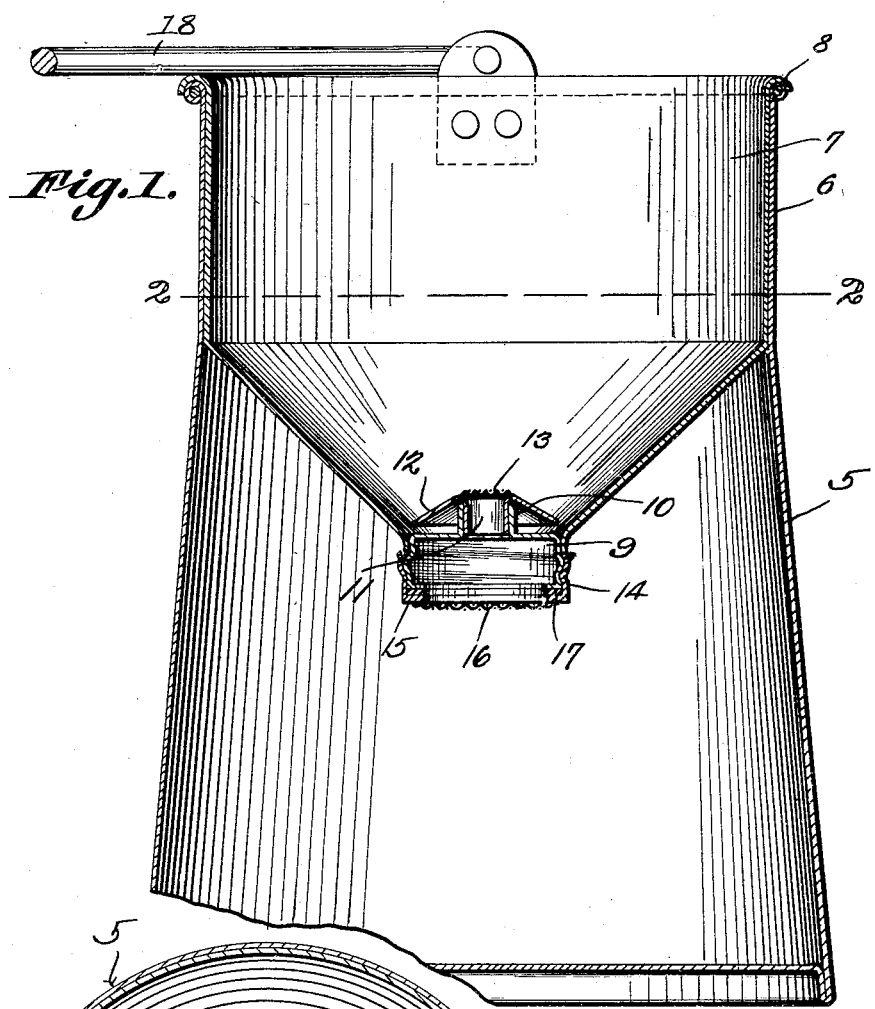
Figure 1 is a longitudinal sectional view through a milk pail constructed in accordance with the invention.
Figure 2:
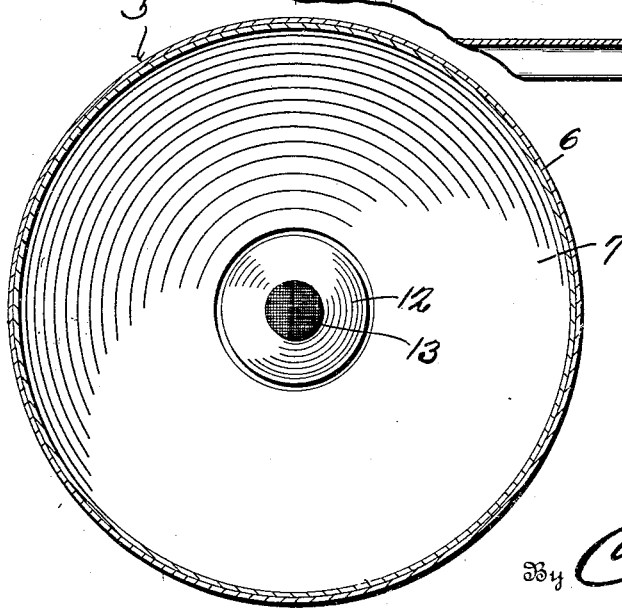
Figure 2 is a sectional view taken on line 2—2 of Figure 1.

Referring to the drawing in detail, the milk pail includes a body portion indicated generally by the reference character 5, the body portion having a substantially straight upper end portion 6 in which the funnel shaped member 7 is held. The upper end of the funnel shaped member 7 is formed with a laterally disposed flange 8 that rests on the upper edge of the body portion 5 of the milk pail.

Positioned in the lower end of the member 7 is a hollow member 9 which is formed with an upstanding extension 10 in which the extension 11 rests, the extension 11 being formed integral with the member 12 that is inclined downwardly, the lower edge thereof being spaced from the funnel shaped member 7 so that a pocket is provided under the member 12 to receive foreign matter that passes over the member 12, or over the inner surface of the funnel shaped member 7. A strainer 13 is positioned on the member 12 overlying the extension to strain the milk passing through the extension.

The member 9 is formed with external threads to receive the threads of the upstanding flange 14 of the straining member 15, the strainer of the member 15 being shown at 16. In order that a fluid tight connection will be provided between members 9 and 14, a gasket 17 is provided, which gasket is held into close engagement with the lower end of the member 9.

A bail indicated at 18 is connected with the body portion and affords means whereby the mail pail may be carried from place to place.

From the foregoing it will be seen that owing to the construction shown and described, the funnel shaped section 7 may be readily and easily removed and the straining elements removed to permit them to be thoroughly cleaned, thereby insuring a milk pail which will be exceptionally sanitary.

I claim:

A strainer comprising a funnel-shaped body portion having an open lower end, a hollow straining member positioned in the open lower end, said hollow straining member including a threaded body portion, a strainer having an upstanding flange formed with threads, to removably connect the strainer to the hollow straining member, said hollow straining member and strainer having cooperating flanges to support a gasket to provide a fluid-tight connection between the hollow straining member and strainer, said hollow straining member having an upstanding flange, and a straining member having an extension held within the confines of the upstanding flange of the hollow straining member.

In testimony that I claim the foregoing as my own, I have hereto affixed my signature.

WILLIAM H. SWARTZ.